(12) United States Patent
Yaney

(10) Patent No.: US 11,198,411 B2
(45) Date of Patent: Dec. 14, 2021

(54) ENERGY-ABSORBING AIRBAG DIFFUSERS AND RELATED AIRBAG ASSEMBLIES

(71) Applicant: Autoliv ASP, Inc., Ogden, UT (US)

(72) Inventor: Joel Yaney, Macomb, MI (US)

(73) Assignee: Autoliv ASP. Inc., Ogden, UT (US)

( * ) Notice: Subject to any disclaimer, the term of this patent is extended or adjusted under 35 U.S.C. 154(b) by 307 days.

(21) Appl. No.: 16/388,595

(22) Filed: Apr. 18, 2019

(65) Prior Publication Data

US 2020/0331423 A1 Oct. 22, 2020

(51) Int. Cl.
| | |
|---|---|
| *B60R 21/261* | (2011.01) |
| *B60R 21/274* | (2011.01) |
| *B60R 21/2338* | (2011.01) |
| *B60R 21/235* | (2006.01) |

(52) U.S. Cl.
CPC .......... *B60R 21/261* (2013.01); *B60R 21/274* (2013.01); *B60R 21/235* (2013.01); *B60R 21/2338* (2013.01); *B60R 2021/23576* (2013.01)

(58) Field of Classification Search
CPC . B60R 21/261; B60R 21/274; B60R 21/2338; B60R 2021/23576; B60R 21/235; B60R 21/2346; B60R 21/2334; B60R 2021/23382; B60R 2021/23332; B60R 21/233; B60R 2021/23123
See application file for complete search history.

(56) References Cited

U.S. PATENT DOCUMENTS

| | | | | |
|---|---|---|---|---|
| 3,797,855 A | * | 3/1974 | Wright, Jr. ........... | B60R 21/2342 280/743.2 |
| 3,799,573 A | * | 3/1974 | McDonald ............ | B60R 21/205 280/740 |
| 4,842,300 A | * | 6/1989 | Ziomek ................. | B60R 21/205 280/732 |
| 5,094,477 A | * | 3/1992 | Togawa ............... | B60R 21/2342 280/728.2 |
| 5,172,933 A | * | 12/1992 | Strasser ................ | B60R 21/233 280/732 |
| 5,226,671 A | * | 7/1993 | Hill ........................ | B60R 21/23 280/743.1 |
| 5,249,824 A | * | 10/1993 | Swann .................. | B60R 21/233 280/729 |
| 5,503,429 A | * | 4/1996 | Wallner ............... | B60R 21/2171 280/728.1 |

(Continued)

*Primary Examiner* — Drew J Brown
*Assistant Examiner* — Timothy Wilhelm
(74) *Attorney, Agent, or Firm* — Matthew D. Thayne; Thayne and Davis LLC

(57) ABSTRACT

Airbag cushion diffusers comprising one or more frangible portions and related airbag cushion assemblies and methods. In some embodiments, an airbag cushion assembly may comprise an airbag cushion having an internal diffuser positioned therein. The internal diffuser may comprise a lower panel that may be sewn or otherwise directly coupled to the airbag cushion and an upper panel coupled to the lower panel about respective entire peripheries of the upper and lower panels so as to define a diffuser chamber between the upper panel and the lower panel. The upper panel may comprise a plurality of openings for delivery of inflation gas therethrough and may comprise one or more openings, slits, and/or weakened regions configured to facilitate tearing in specific locations of the diffuser.

15 Claims, 7 Drawing Sheets

(56) References Cited

U.S. PATENT DOCUMENTS

| | | | | |
|---|---|---|---|---|
| 5,516,146 A | * | 5/1996 | Kopitzke | B60R 21/2171 280/728.2 |
| 5,529,337 A | * | 6/1996 | Takeda | B60R 21/233 280/729 |
| 5,573,270 A | * | 11/1996 | Sogi | B60R 21/233 280/740 |
| 5,788,266 A | * | 8/1998 | Rose | B60R 21/2171 280/728.2 |
| 5,833,265 A | * | 11/1998 | Seymour | B60R 21/2342 280/743.1 |
| 5,913,535 A | * | 6/1999 | Taguchi | B60R 21/233 280/729 |
| 5,957,485 A | * | 9/1999 | Hirai | B60R 21/235 280/729 |
| 6,224,101 B1 | * | 5/2001 | Nishijima | B60R 21/217 280/728.2 |
| 6,267,408 B1 | * | 7/2001 | Jarboe | B60R 21/233 280/729 |
| 6,283,499 B1 | * | 9/2001 | Nelsen | B60R 21/2346 280/729 |
| 6,382,662 B1 | * | 5/2002 | Igawa | B60R 21/233 280/729 |
| 6,419,267 B1 | * | 7/2002 | Hashimoto | B60R 21/233 280/729 |
| 6,464,249 B1 | * | 10/2002 | Lacroix | B60R 21/233 280/729 |
| 6,471,239 B1 | * | 10/2002 | Nishijima | B60R 21/233 280/729 |
| 6,471,244 B1 | * | 10/2002 | Nishijima | B60R 21/233 280/729 |
| 6,478,331 B1 | * | 11/2002 | Lang | B60R 21/233 280/729 |
| 6,494,483 B2 | * | 12/2002 | Floersheimer | B60R 21/217 280/740 |
| 6,530,593 B1 | * | 3/2003 | Ross | B60R 21/233 280/729 |
| 6,554,313 B2 | * | 4/2003 | Uchida | B60R 21/233 280/729 |
| 6,585,290 B2 | * | 7/2003 | Pinsenschaum | B60R 21/233 280/729 |
| 6,648,366 B2 | * | 11/2003 | Dillon | B60R 21/233 280/729 |
| 6,676,158 B2 | * | 1/2004 | Ishikawa | B60R 21/233 280/743.1 |
| 6,776,434 B2 | * | 8/2004 | Ford | B60R 21/233 280/729 |
| 6,846,013 B2 | * | 1/2005 | Smith | B60R 21/26 280/736 |
| 6,848,714 B2 | * | 2/2005 | Varcus | B60R 21/233 280/743.1 |
| 7,118,128 B2 | * | 10/2006 | DePottey | B60R 21/205 280/740 |
| 7,147,248 B2 | * | 12/2006 | Lee | B60R 21/233 280/740 |
| 7,195,275 B2 | * | 3/2007 | Abe | B60R 21/231 280/729 |
| 7,210,702 B2 | * | 5/2007 | Soderquist | B60R 21/233 280/740 |
| 7,281,734 B2 | | 10/2007 | Abe et al. | |
| 7,334,812 B2 | * | 2/2008 | Abe | B60R 21/233 280/729 |
| 7,380,822 B2 | * | 6/2008 | Abe | B60R 21/233 280/743.1 |
| 7,422,237 B2 | * | 9/2008 | Kai | B60R 21/233 280/729 |
| 7,600,784 B2 | * | 10/2009 | Kashiwagi | B60R 21/2171 280/729 |
| 7,618,060 B2 | * | 11/2009 | Harvey | B60R 21/2346 280/728.2 |
| 7,648,166 B2 | * | 1/2010 | Maripudi | B60R 21/233 280/740 |
| 7,708,305 B2 | * | 5/2010 | Ishiguro | B60R 21/233 280/729 |
| 7,891,705 B2 | * | 2/2011 | Dennis | B60R 21/233 280/743.1 |
| 7,909,362 B2 | * | 3/2011 | Idomoto | B60R 21/2338 280/743.1 |
| 8,109,534 B2 | * | 2/2012 | Schindzielorz | D06N 3/128 280/743.1 |
| 8,398,113 B2 | * | 3/2013 | Choi | B60R 21/207 280/730.1 |
| 8,465,049 B2 | * | 6/2013 | Tsujimoto | B60R 21/205 280/729 |
| 8,690,185 B2 | * | 4/2014 | Yamaji | B60R 21/233 280/729 |
| 8,764,057 B1 | * | 7/2014 | Jamison | B60R 21/233 280/743.1 |
| 8,840,139 B1 | * | 9/2014 | Borton | B60R 21/2338 280/740 |
| 8,925,962 B2 | * | 1/2015 | Yamada | B60R 21/2334 280/731 |
| 9,027,963 B2 | * | 5/2015 | Murakami | B60R 21/2338 280/743.2 |
| 9,126,566 B2 | * | 9/2015 | Jeong | B60R 21/2346 |
| 9,199,601 B2 | * | 12/2015 | Yamaji | B60R 21/2334 |
| 9,283,921 B2 | * | 3/2016 | Vinton | B60R 21/2346 |
| 9,333,932 B2 | * | 5/2016 | Sakai | B60R 21/205 |
| 9,376,086 B2 | * | 6/2016 | Nebel | B60R 21/239 |
| 9,387,822 B2 | * | 7/2016 | Iida | B60R 21/2346 |
| 9,434,345 B2 | * | 9/2016 | Hiruta | B60R 21/2338 |
| 9,669,794 B2 | * | 6/2017 | Lachat | B60R 21/239 |
| 9,758,121 B2 | * | 9/2017 | Paxton | B60R 21/2338 |
| 9,771,050 B1 | * | 9/2017 | Jamison | B60R 21/203 |
| 10,065,595 B1 | * | 9/2018 | Kipnis | B60R 21/233 |
| 10,780,859 B2 | * | 9/2020 | Ishida | B60R 21/2338 |
| 10,953,843 B2 | * | 3/2021 | Ukita | B60R 21/274 |
| 2002/0005639 A1 | * | 1/2002 | Varcus | B60R 21/2346 280/743.1 |
| 2003/0201628 A1 | * | 10/2003 | Roychoudhury | B60R 21/2346 280/729 |
| 2004/0004345 A1 | * | 1/2004 | Kayser | B60R 21/26 280/740 |
| 2005/0104351 A1 | * | 5/2005 | Lorenz | B60R 21/2346 280/743.1 |
| 2005/0173897 A1 | * | 8/2005 | Abe | B60R 21/261 280/729 |
| 2006/0197320 A1 | * | 9/2006 | Abe | B60R 21/233 280/729 |
| 2007/0222194 A1 | * | 9/2007 | Harvey | B60R 21/26 280/740 |
| 2011/0148083 A1 | * | 6/2011 | Paxton | B60R 21/2346 280/736 |
| 2019/0308582 A1 | * | 10/2019 | Stegmeier | B60R 21/233 |
| 2021/0039584 A1 | * | 2/2021 | Issler | B60R 21/217 |

\* cited by examiner

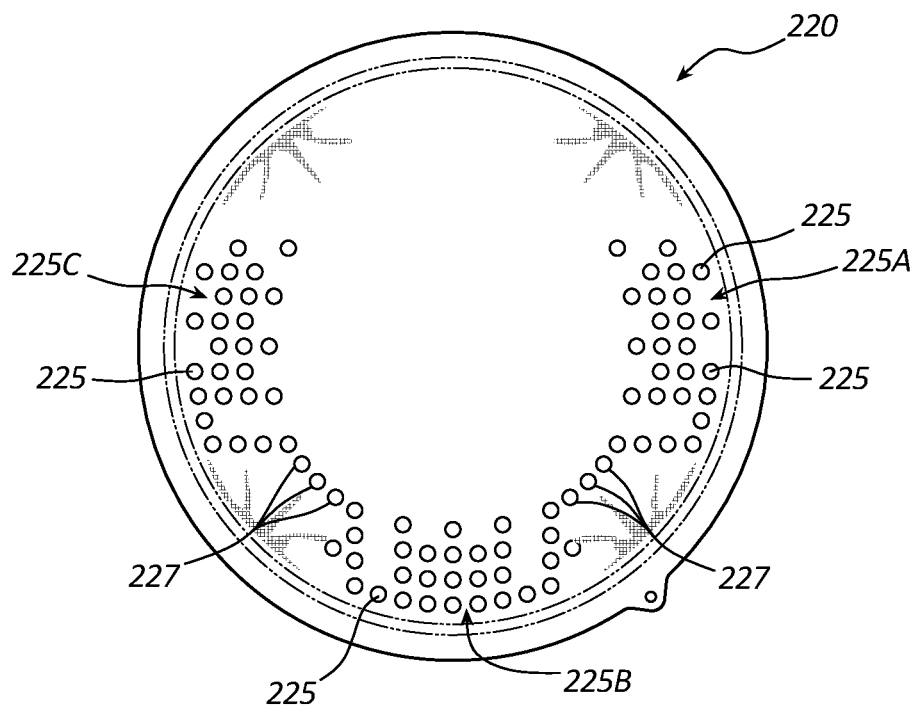
FIG. 8
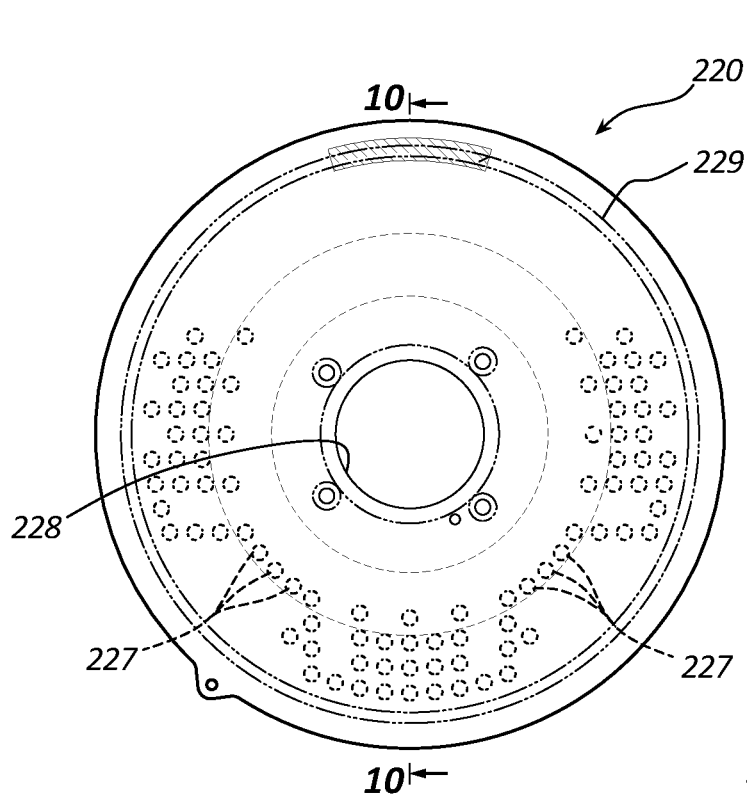 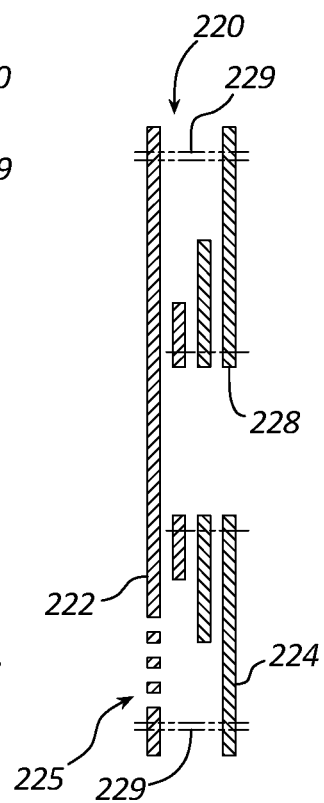
FIG. 9 FIG. 10

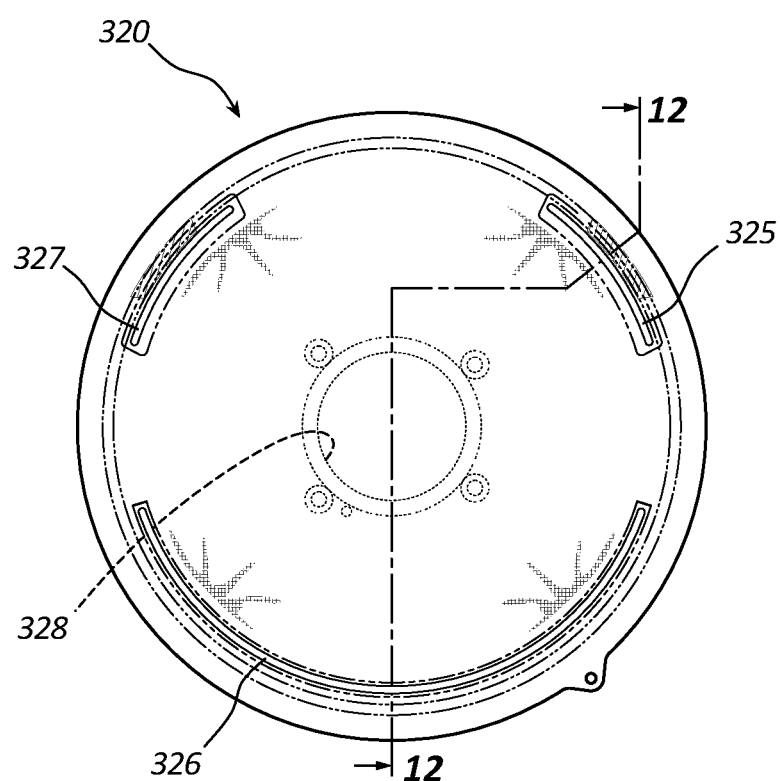 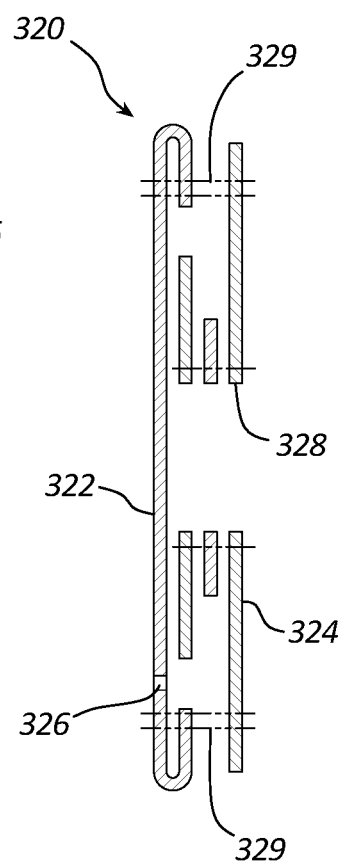
FIG. 11  FIG. 12

ENERGY-ABSORBING AIRBAG DIFFUSERS AND RELATED AIRBAG ASSEMBLIES

SUMMARY

Airbag cushions are often provided with internal diffusers for distributing inflation gases during deployment of an accompanying inflator. However, existing diffusers suffer from several drawbacks. For example, they may fail to protect other components of the airbag assembly from damage during deployment. They may also limit the locations from which internal tethers may extend because such tethers may only extend through ventilation openings in certain directions, particularly if the diffuser is made from a single panel that extends over an inflation opening. Existing diffusers are also rather limited in their ability to allow for precise tuning of desired inflation kinematics.

The present inventors have therefore determined that it would be desirable to provide apparatus, systems and methods that overcome one or more of the foregoing limitations and/or other limitations of the prior art. In some embodiments, the inventive concepts disclosed herein may therefore allow for providing airbag cushion diffusers that absorb inflation energy to decrease deployment forces in particular directions and/or allow for precise tuning of inflation characteristics. In some embodiments, one or more such benefits may be provided by providing arrays or other groupings of various holes, slits, openings, and/or weakened portions, one or more of which may be specifically configured to result in tearing/rupture of the diffuser in specific desired regions of the diffuser. In embodiments comprising both holes or other openings and functionally-coupled slits, the diffuser may be configured to generate stages of inflation in which inflation gas is initially distributed through the holes/openings and later through larger openings caused by the intentional rupturing in specific, targeted regions. By simple repositioning of the various holes, slits, openings, and/or weakened portions a wide variety of deployment characteristics may be provided for by tuning.

In a more particular example of an airbag cushion assembly according to some embodiments, the airbag cushion assembly may comprise an airbag cushion and a diffuser positioned within the airbag cushion, preferably adjacent to a throat region of the airbag cushion. The diffuser may comprise a first panel and a second panel coupled to the first panel so as to define a diffuser chamber therebetween. One or both of the first and second panels may comprise a plurality of openings to allow for delivery of inflation gas from the diffuser chamber therethrough. One or more targeted portions of the diffuser may be configured to rupture during deployment of the airbag cushion to absorb energy from inflation gas and increase a collective area through which inflation gas may be delivered from the diffuser chamber during deployment of the airbag cushion.

In some embodiments, the plurality of openings may comprise a plurality of holes and at least one slit. In some such embodiments, the at least one slit may extend between a first hole of the plurality of holes and a second hole of the plurality of holes. In some embodiments, slits may extend between multiple holes and/or arrays of holes, which may facilitate rupturing in desired directions and locations. In some embodiments, the at least one slit may extend between the first hole and the second hole without extending into the first hole or the second hole. In some embodiments, the plurality of holes may comprise a first array of holes and a second array of holes spaced apart from the first array of holes. In some such embodiments, the at least one slit may extend between the first array of holes and the second array of holes.

In another example of an airbag cushion assembly according to some embodiments, the assembly may comprise an airbag cushion and a diffuser positioned within the airbag cushion. The diffuser may comprise a lower panel directly coupled to the airbag cushion and an upper panel coupled to the lower panel about respective entire peripheries of the upper and lower panels so as to define a diffuser chamber between the upper panel and the lower panel. In some such embodiments, the diffuser may be sewn directly to the cushion. Alternatively, one or both panels of the diffuser may be clamped using studs or other fasteners, which may be part of an inflator assembly and/or ring, to the cushion. In some embodiments, the upper panel may comprise a plurality of openings for delivery of inflation gas therethrough.

In some embodiments, the upper panel may be sewn or otherwise coupled to the lower panel to at least substantially prevent inflation gas from exiting a diffuser chamber defined by the upper and lower panels about the respective peripheries of the upper and lower panels. In some embodiments, the fluid seal may be provided by clamping the peripheral edges of the upper and lower panels together. It should also be understood that the peripheral edge of the diffuser, whether provided with one panel or two, may be clamped to the cushion, such as about the throat region of the cushion, rather than sewn there if desired.

The airbag cushion may comprise a throat region comprising an inflator opening configured to receive and inflator therethrough. The lower panel may be sewn or otherwise coupled to the airbag cushion along the throat region.

In some embodiments, at least a portion of the diffuser may be configured to rupture during deployment of the airbag cushion to absorb energy from inflation gas. In some such embodiments, the at least a portion of the diffuser configured to rupture during deployment of the airbag cushion may be positioned adjacent to at least one of the plurality of openings.

In some embodiments, the plurality of openings may comprise at least one slit. In some such embodiments, the at least a portion of the diffuser configured to rupture during deployment of the airbag cushion may be contiguous with the at least one slit.

In an example of an airbag module according to some embodiments, the module may comprise an airbag cushion comprising an inflator opening and an inflator extending through the inflator opening. A diffuser may be coupled to the airbag cushion about the inflator opening. The diffuser may comprise a plurality of opening arrays each comprising a plurality of openings and at least one slit extending between each adjacent opening array of the plurality of opening arrays. In some such embodiments, the diffuser may further comprise a lower panel and an upper panel coupled to the lower panel about respective peripheries of the upper and lower panels. The lower panel may be directly coupled to the airbag cushion about the inflator opening where additional material may be located or the diffuser may be otherwise less likely to fail.

In some embodiments, the lower panel may be coupled to the upper panel to at least substantially prevent inflation gas from exiting a diffuser chamber defined by the upper and lower panels about the respective peripheries of the upper and lower panels.

In some embodiments, at least a portion of the diffuser may be configured to rupture during deployment of the airbag cushion to absorb energy from inflation gas. In some such embodiments, the at least a portion of the diffuser configured to rupture during deployment of the airbag cushion may be positioned in between two adjacent opening arrays of the plurality of opening arrays.

In some embodiments, the at least a portion of the diffuser configured to rupture during deployment of the airbag cushion is contiguous with the at least one slit.

In some embodiments, the diffuser may comprise a first array of openings and a second array of openings, and a third array of openings positioned in between the first and second arrays of openings. A first slit may extend between the first array of openings and the third array of openings and a second slit may extend between the third array of openings and the second array of openings.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 8 is a top plan view of an energy-absorbing diffuser according to other embodiments;

FIG. 9 is a bottom plan view of a bottom panel of the energy-absorbing diffuser of FIG. 8 with the upper panel shown in phantom;

FIG. 10 is a cross-sectional view taken along line 10-10 in FIG. 9;

FIG. 11 is a top plan view of an upper panel of an energy-absorbing diffuser according to still other embodiments with the lower panel shown in phantom; and FIG. 12 is a cross-sectional view taken along line 12-12 in FIG. 11.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
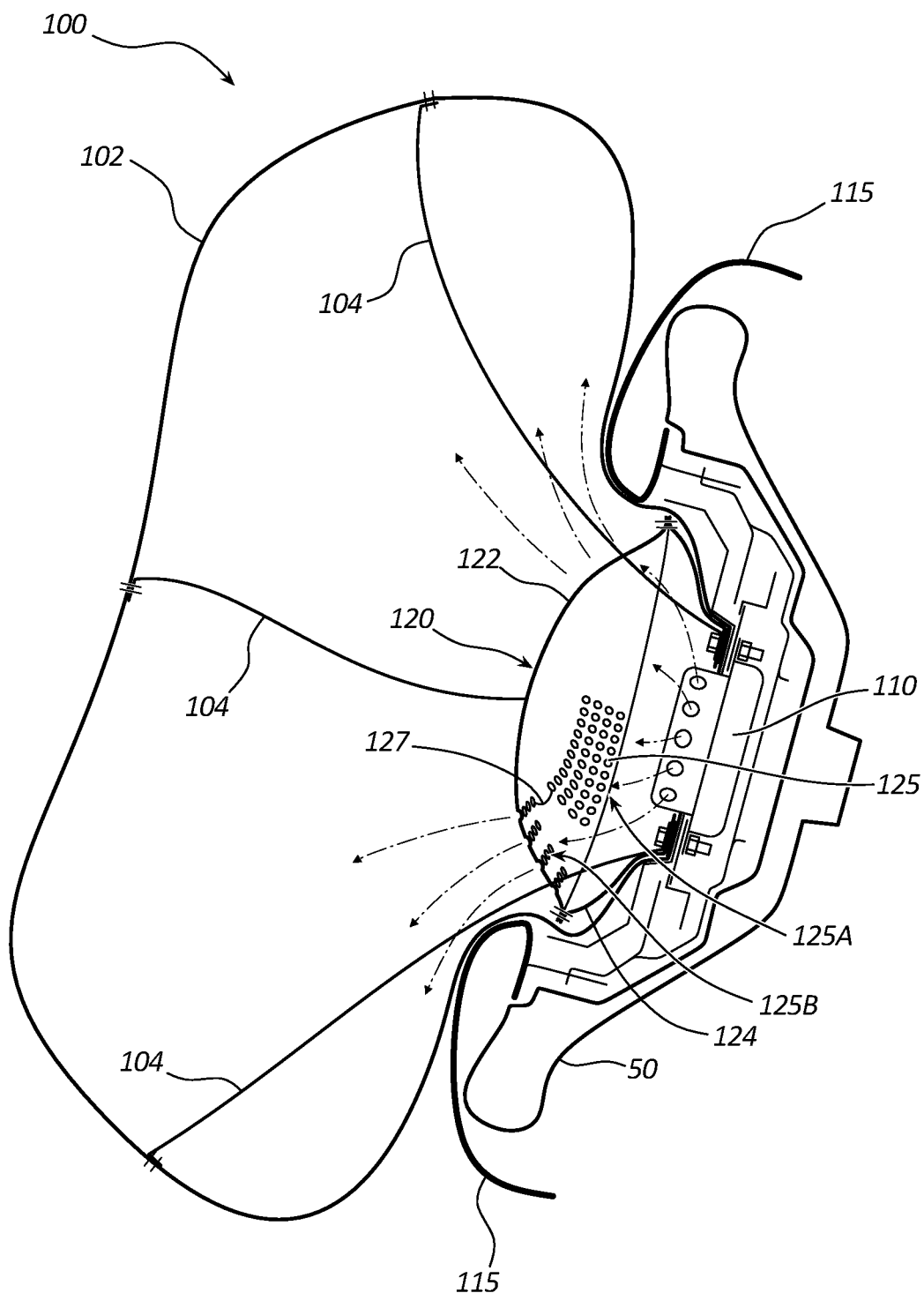
FIG. 1 depicts a driver-side airbag cushion assembly during deployment comprising an energy-absorbing diffuser according to some embodiments.

FIG. 1 depicts an example of an airbag assembly 100 according to some embodiments during deployment from a cover 115 positioned within a steering wheel 50. As shown in this figure, a diffuser 120 is positioned within airbag cushion 102 adjacent to a throat region of the cushion 102 about an inflator 110. A plurality of tethers 104 are also coupled to an inner surface of cushion 102. As discussed elsewhere in this disclosure, the configuration of diffuser 120 may allow for one or more such tethers to extend in any desired direction, which may be facilitated by virtue of the tethers 104 being coupled to cushion 102 without extending into diffuser 120.

In the depicted embodiment, diffuser 120 comprises two panels that may be sewn or otherwise coupled to each other about their respective peripheral edges. More particularly, diffuser 120 comprises an upper panel 122 coupled to a lower panel 124 so as to define a diffuser chamber therebetween. Lower panel 124 may be coupled about the throat region of cushion 102, as shown in FIG. 1.

As also shown in FIG. 1, diffuser 120 comprises a plurality of openings 125 that are configured to allow for delivery of inflation gas from the diffuser chamber within diffuser 120. In the depicted embodiment, openings 125 are formed in upper panel 122, but it is contemplated that, in alternative embodiments, such openings may be formed in lower panel 124 instead of, or in addition to, upper panel 122. In addition, still other embodiments are contemplated in which a single panel, or more than two panels, may be used to form a suitable diffuser.

In preferred embodiments, including diffuser 120, the diffuser is configured to rupture during deployment to absorb energy from the inflation gases. This may be accomplished in a variety of ways, as discussed throughout this disclosure. For example, diffuser 120 comprises slits 127. Slits 127 are positioned adjacent to arrays of openings 125. More particularly, upper panel 122 of diffuser 120 comprises three distinct arrays—arrays 125A, 125B, and 125C—of openings 125. Although only two of these arrays are visible in FIG. 1, others can be seen in subsequent figures.

Figure 3:
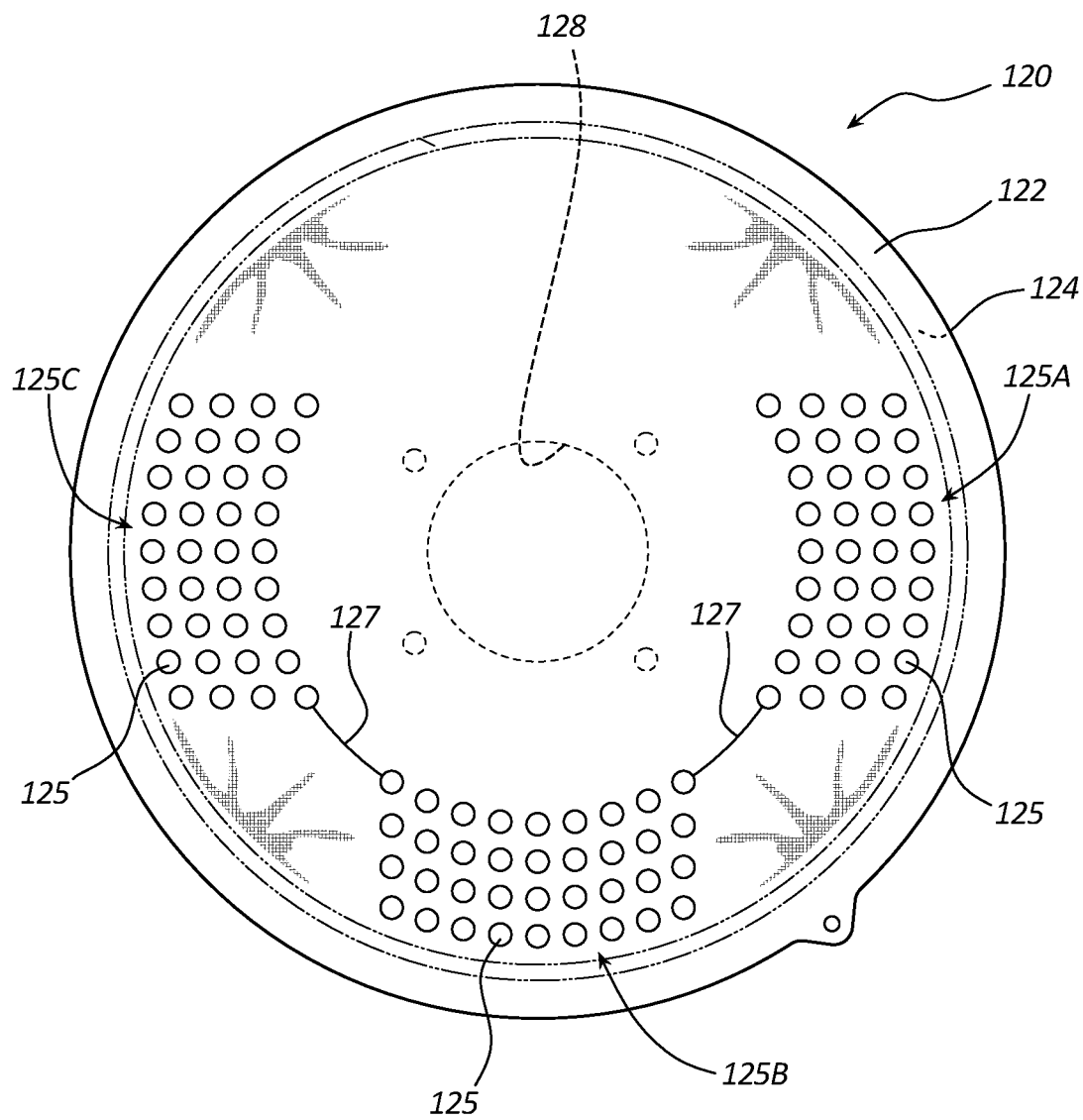
FIG. 3 is a top plan view of the energy-absorbing diffuser of FIGS. 1 and 2.

Slits 127 may facilitate a desired tearing of diffuser 120 by, for example, extending into or immediately adjacent one of the holes 125 of one or more of the aforementioned hole arrays. For example, as shown in FIG. 3, a first slit 127 may extend between arrays 125A and 125B and a second slit 127 may extend between arrays 125B and 125C.

Although the slits 127 depicted in this embodiment extend into one of the holes of each respective hole array, it is contemplated that, in other embodiments, slits 127 or other openings may instead extend between holes 125 without extending into one or more such holes 125 and/or may extend into spaces between such holes 125. Similarly, it is also contemplated that slits 127 may be replaced with another means for facilitating a targeted rupturing of an airbag diffuser, such as a score line, a series of contiguous slits having bridges of materials therebetween, or the like.

The presence of holes 125 adjacent to slits 127 may allow for a tear/rupture to be directed such that it propagates in desired directions to provide for any desired deployment characteristics. For example, in an embodiment specifically configured for use in connection with a driver-side airbag cushion, as is the case with the embodiments of the accompanying figures, the openings and/or slits may be arranged along the bottom (relative to the vehicle steering wheel) of the cushion, which may provide for improved lower rim coverage and may reduce the likelihood of occupant injury. As a further potential benefit, inflation gases may be directed away from hinges or other sensitive regions in the assembly, such as the cover, which, along with the absorption of energy provided by the intentional rupturing, may reduce the possibility of damage to one or more elements of the assembly.

Although a smaller number of larger slits and/or other openings may be used in alternative embodiments, use of a relatively large number of small openings may be preferred so as to allow for fine tuning of desired performance, including, for example, the direction or directions at which the inflation gas travels from the diffuser 120, the amount and locations of tearing of the diffuser during deployment, which may affect the amount of energy absorbed by the diffuser 120.

Figure 2:
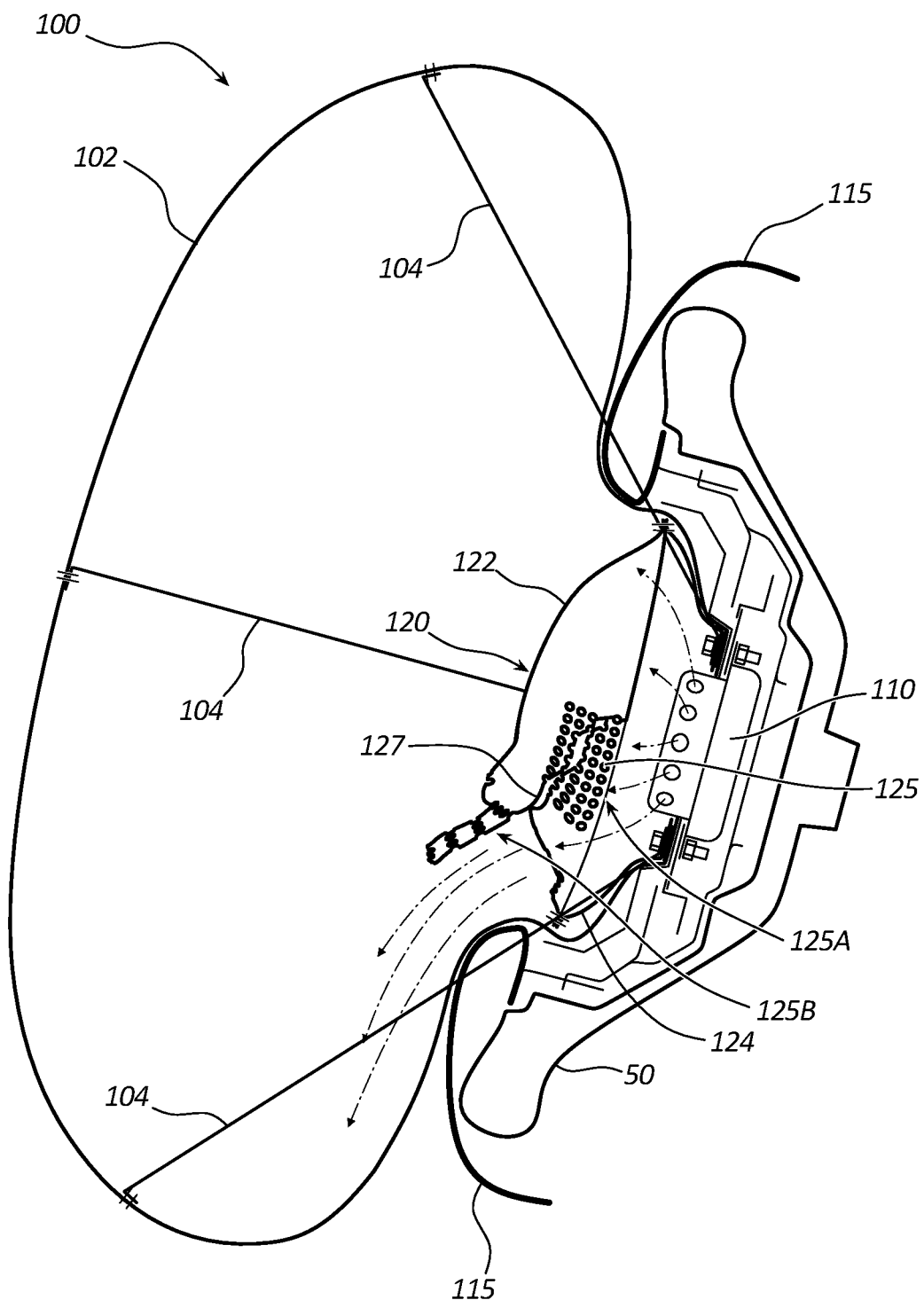
FIG. 2 depicts the airbag cushion assembly of FIG. 1 during a later stage of deployment showing the diffuser rupturing.

FIG. 1 depicts airbag cushion assembly 100 during an initial stage of deployment. As indicated by the arrows from holes 125, inflation gas may initial exit form these holes 125. Then, as shown in FIG. 2, diffuser 120 may rupture, intentionally, at one or more locations defined by the holes/slits/openings formed therein. Again, because these weakened regions that are configured to rupture are placed along the lower portion of diffuser 120, most of the inflation gas may be directed downward against the lower rim of steering wheel 50.

Figure 4:
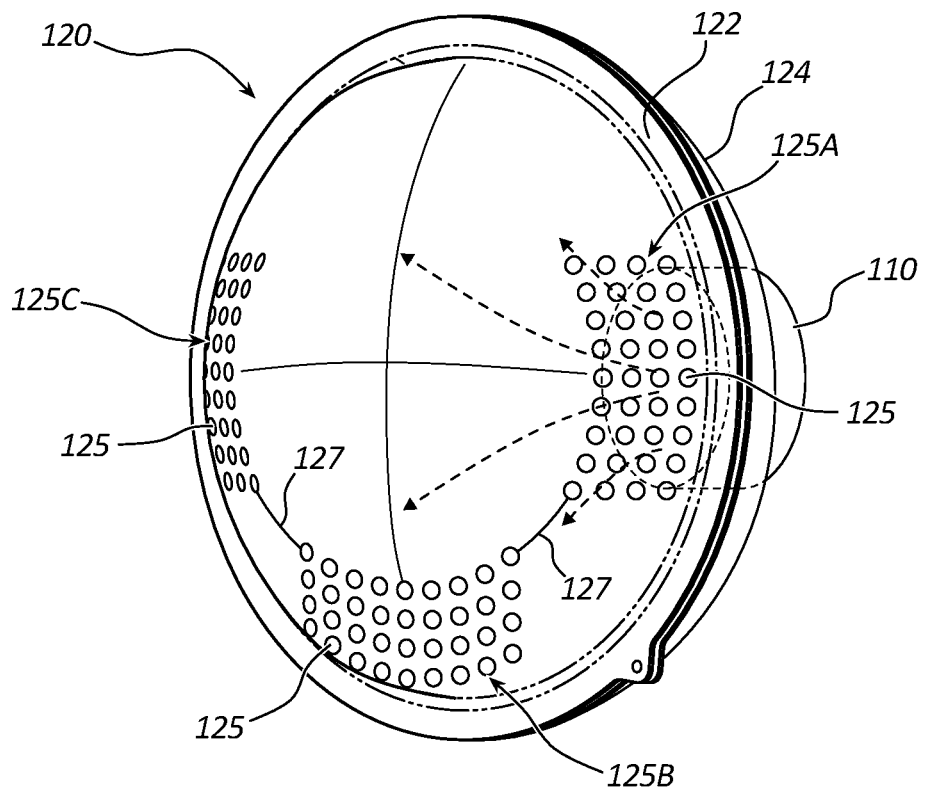
FIG. 4 is a perspective view of the energy-absorbing diffuser during an initial stage of deployment.
Figure 5:
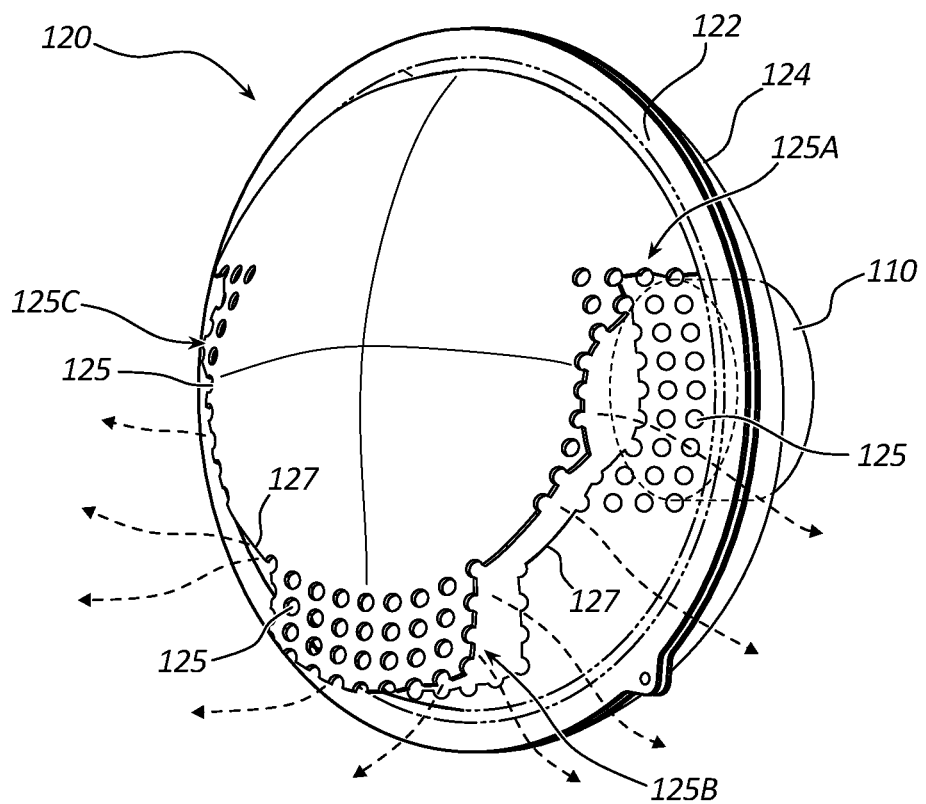
FIG. 5 is a perspective view of the energy-absorbing diffuser during a later stage of deployment.

FIGS. 4 and 5 are perspective views depicting just diffuser 120 and inflator 110 during deployment. Again, these figures show, respectively, that diffuser 120 initially allows for inflation gas from inflator 110 to exit the various holes 125 formed in panel 122 and then, due at least in part to the presence of slits 127, panel 122 ruptures in the directions of the slits 127 and the adjacent holes 125 of arrays 125A, 125B, and 125C.

Figure 6:
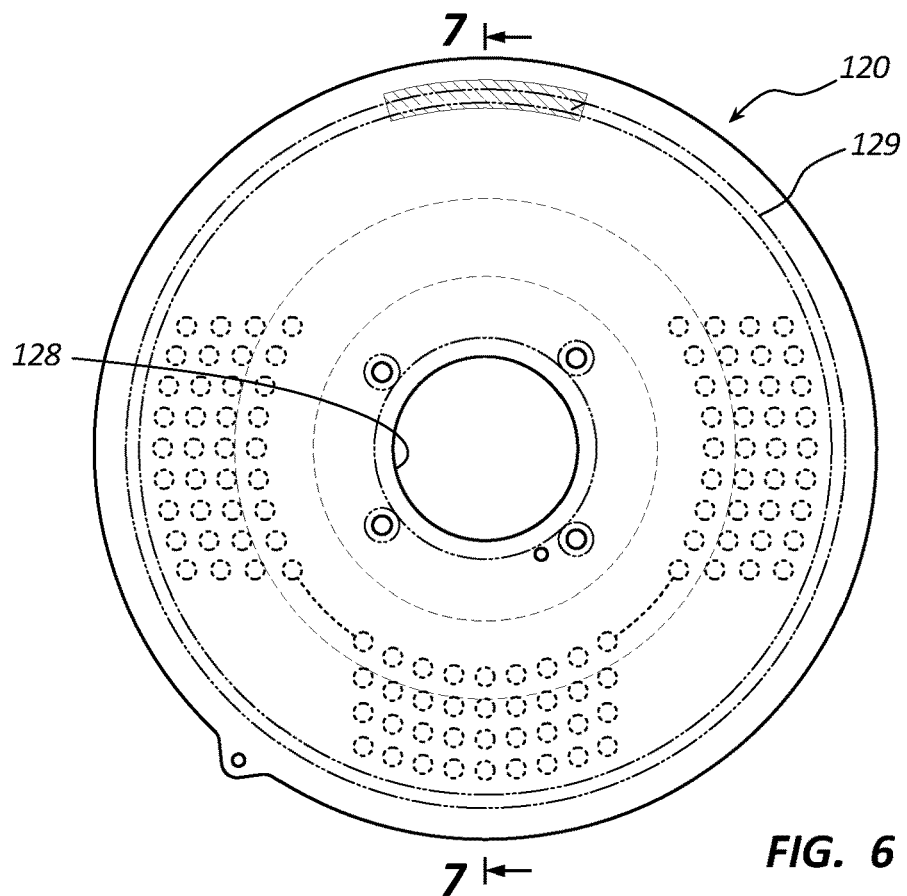
FIG. 6 is a bottom plan view of a bottom panel of the energy-absorbing diffuser with the upper panel shown in phantom.

FIG. 6 is a bottom plan view showing, in phantom, how the two panels previously mentioned may be sewn or otherwise coupled together adjacent to their respective peripheral edges at 129. In addition, FIG. 6 illustrates that an opening 128 may be formed in the lower panel (panel 124), which may allow the inflator 110 to extend therethrough. Preferably, opening 128 is formed so as to form a relatively tight fit around the inflator 110 and may therefore have dimensions approximating those of the cross-sectional area of the inflator 110.

Figure 7:
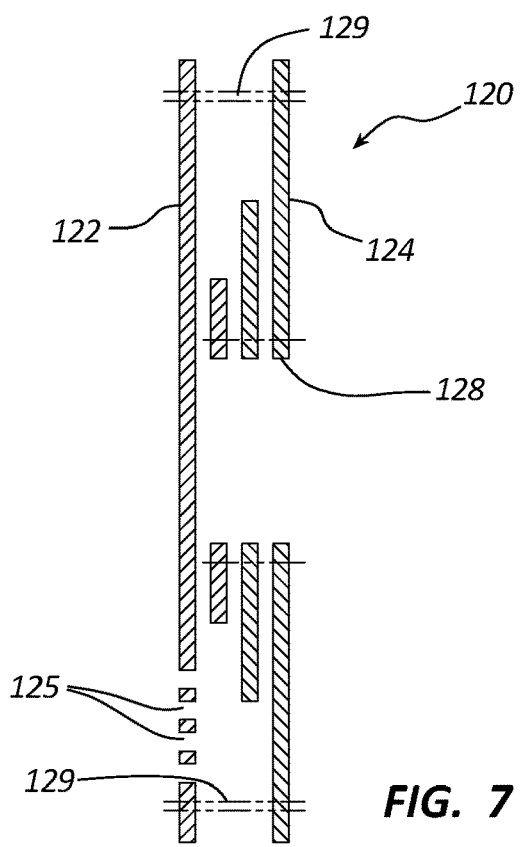
FIG. 7 is a cross-sectional view taken along line 7-7 in FIG. 6.

FIG. 7 is a cross-sectional view illustrating with more particularity the methodology by which upper panel 122 of diffuser 120 may be coupled with lower panel 124. Thus, the sew line 129 is shown adjacent to the respective outer edges of panels 122 and 124. Preferably, sew line 129 is continuous about this perimeter to preclude or at least inhibit gas distribution therethrough and may, also shown in this figure, comprise a double-needle stitch. In certain embodiments and implementations, a double-needle chain stitch may be used, although in other embodiments lock stitches or other coupling means may be used. In some more specific embodiments and implementations, the slits 127 may extend at an acute angle, such as a 45-degree angle, relative to the weave of the fabric used to manufacture the diffuser, which may further facilitate desired rupturing. Finally, as shown in FIG. 7, additional layers of fabric may be used about inflator opening 128 if desired to improve the strength of diffuser 120 in or near the throat region.

FIGS. 8-10 illustrate an example of another embodiment of a diffuser 220 that may be used in connection with various driver-side or other airbag assemblies. As with diffuser 120, diffuser 220 comprises an upper/outer panel 222 and a lower/inner panel 224 coupled together about their respective perimeters using stitches 229. Outer panel 222 again also comprises a plurality of openings, namely, holes 225, one or more of which are configured to rupture during deployment. The holes 225 of this embodiment are again arranged in a series of adjacent arrays 225A, 225B, and 225C.

However, rather than being connected with slits, lines formed by adjacent holes 227 are used to functionally couple adjacent arrays together and may be configured to direct tearing from one array to the adjacent array(s). In addition, the holes of each array are arranged in patterns that differ from those of diffuser 120. It is also contemplated that these alternative patterns, or any other desired pattern of holes, slits, and/or openings may be used as desired. Thus, the connecting lines formed from holes 227 may be replaced with slits similar to slits 127 if desired.

Diffuser 220 may otherwise be identical or similar to diffuser 120. Thus, as shown in FIG. 10, opening 228 for receipt of an inflator therethrough may be formed in panel 224 and may be reinforced with additional material layers if desired. In addition, in preferred embodiments, a double-stitch 229 may be used about the perimeters of panels 222 and 224 if desired.

Yet another example of a diffuser 320 is shown in FIGS. 11 and 12, which may be used in connection with various driver-side or other airbag assemblies. Diffuser 320 again comprises an upper/outer panel 322 and a lower/inner panel 324 coupled together about their respective perimeters using stitches 329. Outer panel 322 again also comprises a plurality of openings. However, in this embodiment, these openings comprise elongated slit-like openings 325, 327, and 329. In some embodiments, one or more of these openings may be configured to rupture and expand during deployment. However, in other embodiments, openings 325, 327, and/or 329 may simply be configured to expand without rupturing during deployment.

Diffuser 320 may otherwise be identical or similar to diffusers 120 and 220. Thus, as shown in FIG. 12, opening 328 for receipt of an inflator therethrough may be formed in panel 324 and may be reinforced with additional material layers if desired. In addition, in preferred embodiments, a double-stitch 329 may be used about the perimeters of panels 322 and 324 if desired. In addition, the outer perimeter of panel 322 (and/or panel 324 in other embodiments) may be folded to provide additional reinforcement along the exterior perimeter coupling if desired.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
   an airbag cushion; and
   a diffuser positioned adjacent to a throat region of the airbag cushion, wherein the diffuser comprises:
      a first panel; and
      a second panel coupled to the first panel so as to define a diffuser chamber therebetween, wherein the first panel defines a lower portion of the diffuser adjacent to the throat region and the second panel defines an upper portion of the diffuser opposite the lower portion and distal of the throat region relative to the lower portion, wherein the second panel comprises a plurality of openings formed in the second panel to allow for delivery of inflation gas from the diffuser chamber therethrough, and wherein the diffuser is configured to rupture adjacent the plurality of openings during deployment of the airbag cushion to absorb energy from inflation gas and increase a collective area through which inflation gas may be delivered from the diffuser chamber during deployment of the airbag cushion.

2. The airbag cushion assembly of claim 1, wherein the plurality of openings comprises a plurality of holes and at least one slit.

3. The airbag cushion assembly of claim 2, wherein the at least one slit extends between a first hole of the plurality of holes and a second hole of the plurality of holes.

4. The airbag cushion assembly of claim 3, wherein the at least one slit extends between the first hole and the second hole without extending into the first hole or the second hole.

5. The airbag cushion assembly of claim 2, wherein the plurality of holes comprises a first array of holes and a second array of holes spaced apart from the first array of holes.

6. The airbag cushion assembly of claim 5, wherein the at least one slit extends between the first array of holes and the second array of holes.

7. An airbag cushion assembly, comprising:
   an airbag cushion; and
   a diffuser positioned within the airbag cushion, wherein the diffuser comprises:
      a lower panel directly coupled to the airbag cushion; and
      an upper panel coupled to the lower panel about respective entire peripheries of the upper and lower panels so as to define a diffuser chamber between the upper panel and the lower panel, wherein the upper panel comprises a plurality of openings for delivery of inflation gas therethrough, wherein at least a portion of the diffuser is configured to rupture during deployment of the airbag cushion to absorb energy from inflation gas, wherein the at least a portion of the diffuser configured to rupture during deployment of the airbag cushion is positioned adjacent to at least one of the plurality of openings, wherein the plurality of openings comprises at least one slit, wherein the at least a portion of the diffuser configured to rupture during deployment of the airbag cushion is contiguous with the at least one slit, and wherein the at least one slit is formed in a line extending between at least two openings of the plurality of openings.

8. The airbag cushion assembly of claim 7, wherein the upper panel is sewn to the lower panel to at least substantially prevent inflation gas from exiting a diffuser chamber defined by the upper and lower panels about the respective peripheries of the upper and lower panels.

9. The airbag cushion assembly of claim 7, wherein the airbag cushion comprises a throat region comprising an inflator opening configured to receive and inflator therethrough, and wherein lower panel is coupled to the airbag cushion along the throat region.

10. An airbag module, comprising:
    an airbag cushion comprising an inflator opening;
    an inflator extending through the inflator opening; and
    a diffuser coupled to the airbag cushion about the inflator opening, wherein the diffuser comprises a plurality of opening arrays each comprising a plurality of openings and at least one slit extending between each adjacent opening array of the plurality of opening arrays, wherein at least a portion of the diffuser is configured to rupture during deployment of the airbag cushion to absorb energy from inflation gas, and wherein the at least a portion of the diffuser configured to rupture during deployment of the airbag cushion is positioned in between two adjacent opening arrays of the plurality of opening arrays such that the diffuser is configured to rupture, at least in part, along a line extending between a first opening array of the plurality of opening arrays and a second opening array of the plurality of opening arrays.

11. The airbag module of claim 10, wherein the diffuser further comprises:
a lower panel; and
an upper panel coupled to the lower panel about respective peripheries of the upper and lower panels.

12. The airbag module of claim 11, wherein the lower panel is directly coupled to the airbag cushion about the inflator opening.

13. The airbag module of claim 12, wherein the lower panel is coupled to the upper panel to at least substantially prevent inflation gas from exiting a diffuser chamber defined by the upper and lower panels about the respective peripheries of the upper and lower panels.

14. The airbag module of claim 10, wherein the at least a portion of the diffuser configured to rupture during deployment of the airbag cushion is contiguous with the at least one slit.

15. The airbag module of claim 14, wherein the diffuser comprises:
a first array of openings;
a second array of openings;
a third array of openings positioned in between the first and second arrays of openings;
a first slit extending between the first array of openings and the third array of openings; and
a second slit extending between the third array of openings and the second array of openings.

* * * * *